(12) United States Patent
Stojanovski et al.

(10) Patent No.: US 9,369,912 B2
(45) Date of Patent: *Jun. 14, 2016

(54) COMMUNICATION PATH SWITCHING FOR MOBILE DEVICES

(71) Applicant: Intel Corporation, Santa Clara, CA (US)

(72) Inventors: Alexandre S. Stojanovski, Paris (FR); Frank Kowalewski, Goettingen (DE); Muthaiah Venkatachalam, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/620,089

(22) Filed: Feb. 11, 2015

(65) Prior Publication Data

US 2015/0156702 A1 Jun. 4, 2015

Related U.S. Application Data

(63) Continuation of application No. 13/709,628, filed on Dec. 10, 2012, now Pat. No. 8,982,880.

(60) Provisional application No. 61/679,627, filed on Aug. 3, 2012.

(51) Int. Cl.
*H04W 28/02* (2009.01)
*H04W 24/04* (2009.01)
(Continued)

(52) U.S. Cl.
CPC ............ *H04W 28/0221* (2013.01); *H04L 5/00* (2013.01); *H04L 5/0057* (2013.01);
(Continued)

(58) Field of Classification Search
CPC ........... H04W 4/00; H04W 4/02; H04W 4/34; H04W 4/38
USPC .......................... 370/277–278, 282, 310–350
See application file for complete search history.

(56) References Cited

U.S. PATENT DOCUMENTS 6,574,266 B1 * 6/2003 Haartsen ........................ 375/133
7,751,387 B2    7/2010 Hwang et al.
(Continued)

FOREIGN PATENT DOCUMENTS

EP          1976228 A1    10/2008
KR    1020090006504 A     1/2009

OTHER PUBLICATIONS

PCT/US2013/047262, International Search Report and Written Opinion, Oct. 22, 2013, 10Pages.

*Primary Examiner* — Warner Wong
(74) *Attorney, Agent, or Firm* — Stoel Rives LLP (57) ABSTRACT

Methods, systems, and devices for switching internet protocol (IP) flows from a first communication path to a second communication path are disclosed herein. A user equipment (UE) may include an exchange component, a session component, and a communication component. The exchange component exchanges second communication path availability information between the UE and another UE by sending and receiving session initiation protocol (SIP) messages that include second communication path availability information over the first communication path. The session component changes the communication session by re-routing traffic flows to the second communication path based on the exchanged second path availability information. The communication component sends to and receives from the other UE data corresponding to an IP flow over the second communication path.

21 Claims, 5 Drawing Sheets

(51) Int. Cl.
| | |
|---|---|
| H04W 52/00 | (2009.01) |
| H04L 5/00 | (2006.01) |
| H04L 12/24 | (2006.01) |
| H04L 12/26 | (2006.01) |
| H04L 12/807 | (2013.01) |
| H04L 29/06 | (2006.01) |
| H04L 29/08 | (2006.01) |
| H04W 4/00 | (2009.01) |
| H04W 8/18 | (2009.01) |
| H04W 28/04 | (2009.01) |
| H04W 36/00 | (2009.01) |
| H04W 40/34 | (2009.01) |
| H04W 52/02 | (2009.01) |
| H04W 72/00 | (2009.01) |
| H04W 72/04 | (2009.01) |
| H04W 76/02 | (2009.01) |
| H04W 24/02 | (2009.01) |
| H04N 21/2343 | (2011.01) |
| H04N 21/258 | (2011.01) |
| H04W 40/02 | (2009.01) |
| H04W 16/18 | (2009.01) |
| H04W 76/04 | (2009.01) |
| H04W 24/10 | (2009.01) |
| H04W 4/02 | (2009.01) |
| H04W 12/06 | (2009.01) |
| H04W 64/00 | (2009.01) |
| H04W 88/06 | (2009.01) |
| H04L 12/703 | (2013.01) |
| H04W 16/28 | (2009.01) |
| H04W 36/14 | (2009.01) |
| H04W 88/12 | (2009.01) |

(52) U.S. Cl.
CPC ....... *H04L 41/0659* (2013.01); *H04L 41/0836* (2013.01); *H04L 43/0811* (2013.01); *H04L 45/28* (2013.01); *H04L 47/27* (2013.01); *H04L 65/1006* (2013.01); *H04L 65/4092* (2013.01); *H04L 65/80* (2013.01); *H04L 67/16* (2013.01); *H04L 67/303* (2013.01); *H04N 21/23439* (2013.01); *H04N 21/25825* (2013.01); *H04W 4/00* (2013.01); *H04W 4/005* (2013.01); *H04W 4/008* (2013.01); *H04W 4/02* (2013.01); *H04W 8/18* (2013.01); *H04W 12/06* (2013.01); *H04W 16/18* (2013.01); *H04W 24/02* (2013.01); *H04W 24/04* (2013.01); *H04W 24/10* (2013.01); *H04W 28/0236* (2013.01); *H04W 28/04* (2013.01); *H04W 36/0072* (2013.01); *H04W 40/02* (2013.01); *H04W 40/34* (2013.01); *H04W 52/00* (2013.01); *H04W 52/0209* (2013.01); *H04W 52/0212* (2013.01); *H04W 52/0216* (2013.01); *H04W 64/003* (2013.01); *H04W 72/005* (2013.01); *H04W 72/04* (2013.01); *H04W 72/042* (2013.01); *H04W 72/044* (2013.01); *H04W 72/0406* (2013.01); *H04W 72/0413* (2013.01); *H04W 72/0446* (2013.01); *H04W 76/02* (2013.01); *H04W 76/021* (2013.01); *H04W 76/023* (2013.01); *H04W 76/025* (2013.01); *H04W 76/026* (2013.01); *H04W 76/048* (2013.01); *H04W 88/06* (2013.01); *H04W 16/28* (2013.01); *H04W 36/14* (2013.01); *H04W 52/0258* (2013.01); *H04W 88/12* (2013.01); *Y02B 60/50* (2013.01)

(56) References Cited

U.S. PATENT DOCUMENTS

| | | | |
|---|---|---|---|
| 7,948,890 B2 | 5/2011 | Shieh et al. | |
| 7,970,351 B2 * | 6/2011 | Jabara et al. | 455/41.2 |
| 8,477,591 B2 | 7/2013 | Horio et al. | |
| 8,982,880 B2 | 3/2015 | Stojanovski et al. | |
| 2005/0090242 A1 | 4/2005 | Kotzin et al. | |
| 2006/0062190 A1 | 3/2006 | Suga | |
| 2007/0253418 A1 | 11/2007 | Shiri et al. | |
| 2007/0299927 A1 | 12/2007 | Knauerhase | |
| 2008/0052400 A1 * | 2/2008 | Ekberg | 709/227 |
| 2010/0150120 A1 | 6/2010 | Schlicht et al. | |
| 2010/0318668 A1 * | 12/2010 | Sylvain | 709/228 |
| 2011/0040888 A1 | 2/2011 | Krishnaswamy et al. | |
| 2011/0294474 A1 | 12/2011 | Barany et al. | |
| 2012/0179829 A1 * | 7/2012 | George | 709/227 |
| 2013/0003720 A1 | 1/2013 | Tasker | |
| 2014/0164522 A1 | 6/2014 | Chaturvedi et al. | |
| 2014/0181905 A1 | 6/2014 | Chaturvedi et al. | |

* cited by examiner

COMMUNICATION PATH SWITCHING FOR MOBILE DEVICES

RELATED APPLICATIONS

This application claims priority to U.S. patent application Ser. No. 13/709,628 entitled "Communication Path Switching for Mobile Devices" filed on Dec. 10, 2013, and which claims priority to U.S. Provisional Patent Application No. 61/679,627 entitled "Advanced Wireless Communication Systems and Techniques" filed on Aug. 3, 2012, each of which is hereby incorporated herein by reference in its entirety.

TECHNICAL FIELD

The present disclosure relates to direct communication between mobile devices and more particularly relates to switching an internet protocol (IP) flow from an infrastructure communication path to a direct device-to-device communication path and vice versa.

BACKGROUND

Increasing numbers of mobile devices and users, as well as increased high bandwidth multimedia services and applications, are resulting in increased demands on mobile networks. The 3rd Generation Partnership Project (3GPP) is studying system architecture enhancements that will allow devices, which are located in proximity of each other, to discover each other and to subsequently establish a direct communication path. These direct communication paths may be used to provide proximity-based services (ProSe) or device-to-device (or D2D) communication. By performing direct communication some of the load on the network may be reduced. Additionally, direct communication paths may be used for emergency purposes, such as allowing two or more user equipments (UEs) to act as a public safety or emergency network in the case of failure of all or a portion of a proprietary or public communication infrastructure.

DETAILED DESCRIPTION OF PREFERRED EMBODIMENTS

Although use of a direct communication path between nearby devices may result in a reduction of load on a mobile network, there is currently a need for devices, systems, and methods for switching an already existing Internet Protocol (IP) flow from an infrastructure communication path, such as over a mobile network, to a direct communication path, such as in device-to-device communication. For example, if two mobile terminals are in communication over an infrastructure communication path and come within a direct path communication range, the load on the network could be reduced by allowing switching of one or more IP flows from the infrastructure communication path to the direct communication path for as long as the direct communication path is available.

However, switching an existing IP flow from an infrastructure communication path to a direct communication path is currently not possible with existing devices, protocols, and methods. Switching an existing IP flow is complicated by the fact that a direct communication path is often on a network or subnet that is disjoint, or separate, from an infrastructure communication path. For example, the infrastructure communication path may be accessible via a public or proprietary communications infrastructure while the direct communication path may be located on a private network, such as a private peer-to-peer or device-to-device network, which is not accessible from the communications infrastructure. As such, an IP address used by a user equipment (UE) on a direct communication path may not be accessible through an infrastructure communication path, making sequential switching of destination or source IP addresses ineffective.

For example, with existing standards, such as IP multimedia subsystem (IMS) Service Continuity in 3GPP TS 23.327, it is possible for a first device to tell a second device to use a new IP address for a selected subset of IP flows so that the second device can subsequently send all media packets for the concerned flows to the new IP address. It is possible for the second device to subsequently tell the first device to also use a new IP address for the same subset of IP flows, which could then theoretically complete the re-routing of the traffic flows to the new path.

However, the above sequential approach does not work in the context of switching from an infrastructure communication path to a direct communication path for at least two reasons. First, during the transition period (i.e., between the instant when the second device starts sending packets to the new address for the first device and the instant when the first device starts sending packets to the new address for the second device), all media packets for the impacted flows are lost, and this applies to both directions. Specifically, in the direction from the second device to the first device, the media packets have a direct path address as the destination address and an infrastructure path address as the source address. This means that the packets are sent on the interface facing the infrastructure communication path, while being destined to an IP address on a completely disjoint IP network, which is therefore unreachable. With regard to the direction from the first device to the second device, the media packets have an infrastructure path address as the destination address and a direct path address as the source address. Thus, the packets are sent on the direct communication path. Assuming that the direct communication path is a point-to-point link, the media packets could eventually be delivered to the second device only to be discarded there, because the IMS client in the second device is not expecting any packets arriving on the infrastructure path address.

The second reason is that upon being informed of the IP address change of the first device, the second device does not necessarily attempt to switch its own IP address for the media reception. This failure to switch its own IP address is because these two operations are completely dissociated from one another in current protocols and methods. If this simultaneous switch does not occur, any packets sent in the interval between the switch are lost.

In recognition of the above deficiencies and problems, the applicants have disclosed devices, systems, and methods for switching of IP flows from an infrastructure communication path to a direct communication path. In one embodiment, a mobile terminal is configured to exchange direct path availability information with another mobile terminal. For example, the terminals may exchange one or more session initiation protocol (SIP) INFO messages that include the direct path availability information. The mobile terminal may decide to re-route traffic flows to the direct path based on the direct path availability information and communicate data corresponding to an IP flow over the direct communication path. For example, a SIP INVITE message may be sent following exchange of the direct path availability information in order to modify a current session so that traffic flows are re-routed to the direct communication path. The destination and source IP addresses of a mobile terminal for a specific IP flow may be changed substantially simultaneously based on receipt of a SIP message sent in response to the SIP INVITE message to prevent packet loss.

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Figure 1:
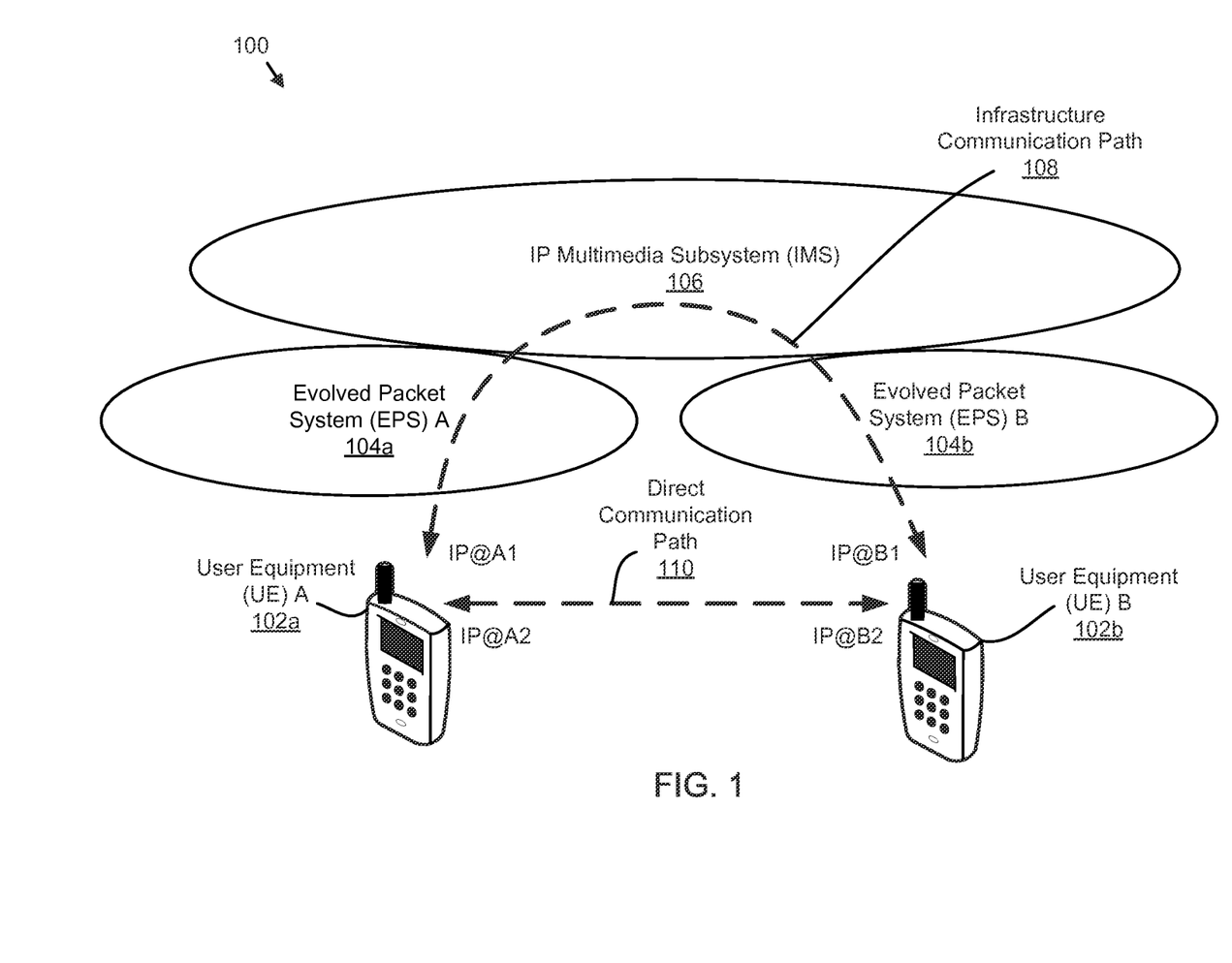
FIG. 1 is a schematic diagram illustrating a mobile communication system with an infrastructure communication path and a direct communication path consistent with embodiments disclosed herein.

Turning now to the figures, FIG. 1 is a schematic diagram of a mobile communication system 100 illustrating example communication paths between UEs. The mobile communication system 100 includes UEs 102a, 102b, evolved packet systems (EPSs) 104a, 104b, and an IP multimedia subsystem (IMS) 106. The UEs 102a, 102b are capable of communication via an infrastructure communication path 108 through the EPSs 104a, 104b and IMS 106 and via a direct communication path 110.

The EPSs 104a, 104b may allow the UEs 102a, 102b to communicate via the IMS 106. The EPSs 104a, 104b may include evolved Node Bs (eNBs) for communication with the UEs 102a, 102b. In other embodiments, a Node B or other radio access network (RAN) may be included, depending on one or more communication standards implemented in an infrastructure or communications network of the mobile communications system 100. In one embodiment, EPS A 104a and EPS B 104b may be owned and/or operated by separate parties to provide access to a common or proprietary IMS 106. In one embodiment, one or more servers, a core network, a communications backbone, or other communication network may replace the IMS 106.

The UEs 102a, 102b may include any type of UEs, mobile terminals, or the mobile communication devices known in the art. The UEs 102a, 102b may include phones, smart phones, tablet devices, laptop computers, or the like. The UEs 102a, 102b may be capable of communicating using one or more mobile communication standards including Long Term Evolution (LTE), LTE-Advanced, Global System for Mobile Communications (GSM), Universal Mobile Telecommunications System (UMTS), or other communication standards. The UEs 102a, 102b may also be capable of communicating directly with each other using one or more direct wireless communication standards, such as wireless fidelity (Wi-Fi) Direct, LTE Direct, or the like.

The UEs 102a, 102b are capable of communication with each other over the infrastructure communication path 108, which routes data through the IMS 106, and/or capable of communication with each other over the direct communication path 110. In one embodiment, the UEs 102a, 102b are configured to switch one or more IP flows which are being communicated over the infrastructure communication path 108 to being communicated over the direct communication path 110. The UE 102a is depicted having an infrastructure path IP address (IP@A1) and a direct path IP address (IP@A2), and the UE 102b is depicted having an infrastructure path IP address (IP@B1) and a direct path IP address (IP@B2). The UEs 102a, 102b communicate with each other over the infrastructure communication path 108 using IP@A1 and IP@B1 and/or communicate over the direct communication path 110 using IP@A2 and IP@B2.

Figure 2:
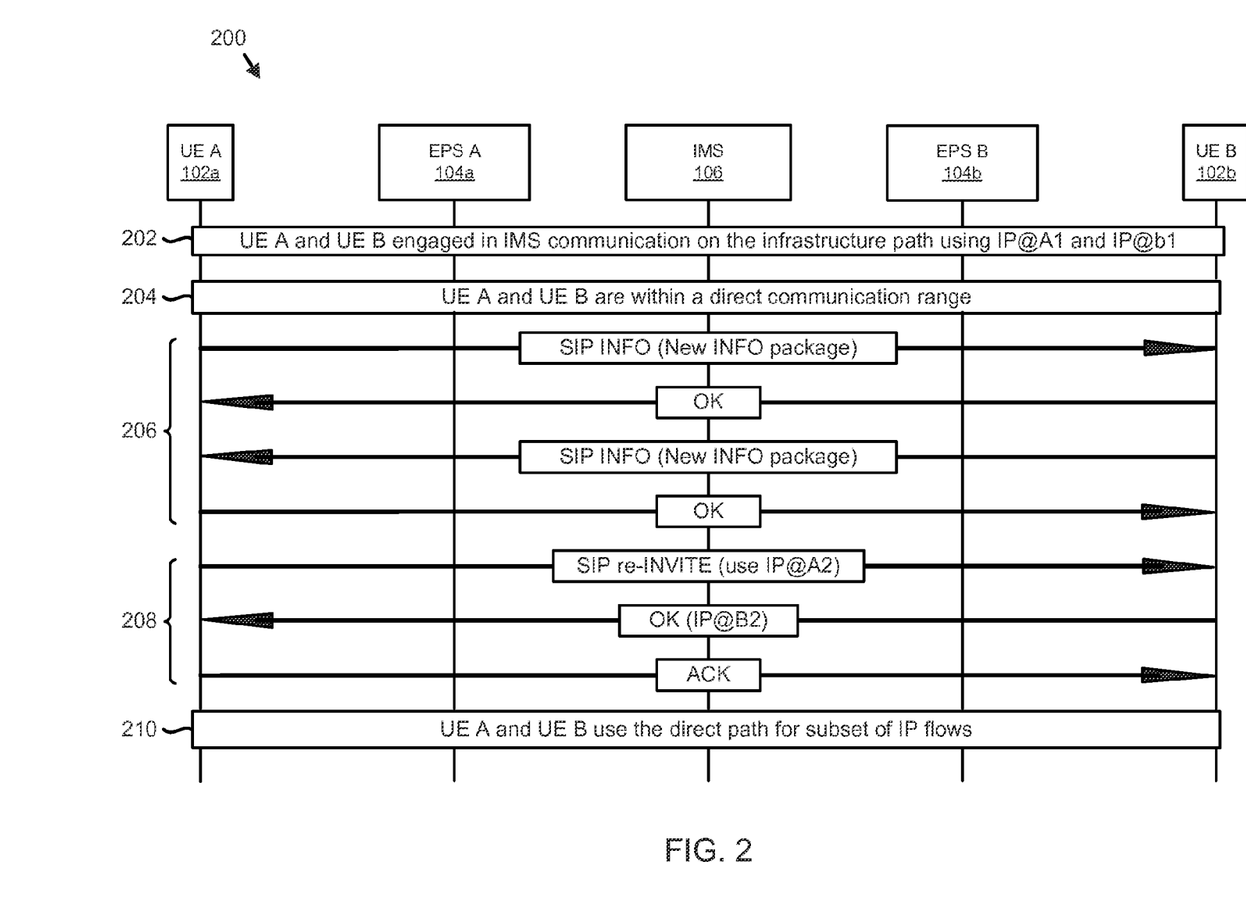
FIG. 2 is a schematic flow chart timeline illustrating an example of interaction between user equipments (UEs) to switch an IP flow from an infrastructure communication path to a direct communication path consistent with embodiments disclosed herein.

FIG. 2 is a schematic flow chart timeline 200 illustrating interaction between UEs 102a, 102b to switch an IP flow from the infrastructure communication path 108 to the direct communication path 110. The timeline 200 depicts the state of communications between the UEs 102a, 102b, as well as specific exchanged messages. The timeline is divided into a number of periods 202, 204, 206, 208, and 210 illustrating example communications between the UEs 102a, 102b.

During period 202, the UEs 102a, 102b are engaged in IMS 106 communication on the infrastructure communication path 108 using IP@A1 (for the UE 102a) and IP@B1 (for the UE 102b). In one embodiment, the communications between the UEs 102a, 102b include multiple IP flows over the infrastructure communication path 108. For example, the IP flows may correspond to a video conference call between users on the UEs 102a, 102b and may include a video IP flow and an audio IP flow.

During period 204, the UEs 102a, 102b are determined to be within a direct communication range. For example, respective users carrying the UEs 102a, 102b may be holding a video conversation while walking through a city. The users may knowingly or unknowingly walk within range for device-to-device communication. The UEs 102a, 102b may determine that they are within a direct path communication range of each other. In one embodiment, the UEs 102a, 102b determine that they are within a direct path communication range based on a notification from a server within the IMS 106, EPSs 104a, 104b, or any other device. In one embodiment, the UEs 102a, 102b may directly determine that they are within range of each other based on a wireless discovery procedure, such as a wireless discovery procedure for wireless local area network (WiFi Direct), LTE Direct, or other wireless communication. In yet another embodiment, the UEs 102a, 102b may determine that they are within range based on input received from one or both of the respective users. For example, a user may realize that the devices are within range and may provide input requesting direct path communication of some or all data.

During period 206, the UEs 102a, 102b proceed to inform each other about the availability of a direct communication path based on determining that they are within range. Messages within the period 206 illustrate one example of informing each other about the availability of a direct communication path. The messages during period 206 include a number of SIP INFO and SIP response messages.

Specifically, the UE 102a sends a SIP INFO message to the UE 102b over the infrastructure communication path 108

(that is, via the EPS 104a, the IMS 106, and the EPS 104b). The SIP INFO message may include information according to a new SIP INFO package that includes direct path availability information for the UE 102a. For example, the direct path availability information may include IP address, information identifying an IP flow, port number, or other information that may be needed to enable the use of the direct communication path.

The UE 102b sends a SIP OK message as a response to acknowledge receipt of the SIP INFO message. The UE 102b may be able to determine, based on the direct path availability information, that the direct communication path is inaccessible over the infrastructure communication path 108. For example, the UE 102b may determine that an IP address included in the direct path availability information is hosted on a private subnet and is inaccessible from an infrastructure communication path 108. The UE 102b may then be able to prepare for exchanging traffic over the direct communication path. For example, the UE 102b may obtain an IP address that is within the same subnet as an IP address sent within the SIP INFO message at time 206.

The UE 102b also sends a SIP INFO message to the UE 102a over the infrastructure communication path 108. The SIP INFO message may include information according to a new SIP INFO package that includes direct path availability information for the UE 102b. For example, the direct path availability information may include IP address, information identifying an IP flow, port number, or other information that may be needed in setting up a direct communication path. For example, the information in the SIP INFO message may mirror the information in the SIP INFO message from the UE 102a but may be specific to the UE 102b. The UE 102a sends a SIP OK message as a response to acknowledge receipt of the SIP INFO message sent by the UE 102b. The SIP INFO message sent by the UE 102b may indicate that the UE 102b has correctly processed the UE 102a's SIP INFO message and/or obtained the details it needs about the UE 102a in order to enable the use of the direct communication path. If the UE 102b cannot correctly process the UE 102a's SIP INFO message then the UE 102b may indicate in its SIP INFO message that it does not accept the information in the SIP INFO message received from UE 102a.

During period 208, the UEs 102a, 102b may proceed to re-route traffic flows to the direct communication path. For example, during period 208 the UEs 102a, 102b may re-route traffic flows to the direct communication path in response to exchanging direct path availability information during period 206.

The UE 102a sends a SIP INVITE message to the UE 102b over the infrastructure communication path 108 to trigger re-routing of traffic flows to the direct communication path. In one embodiment, the SIP INVITE message includes information for re-routing of traffic flows to the direct communication path for both the UE 102a and the UE 102b. The SIP INVITE message also is referred to as a re-INVITE message because the UE 102a and the UE 102b are already engaged in a SIP signaling session over the infrastructure communication path 108 and the SIP INVITE message modifies the existing communication session. The SIP INVITE message may indicate that the UE 102b can use the new direct path IP address, IP@B2, for designated IP flows. Note that although the UE 102a sent the SIP INVITE message to modify the existing communication session, the UE 102b may do so in some embodiments.

The UE 102b sends a SIP OK message indicating that it has received the SIP INVITE message from the UE 102a and is prepared to communicate over the direct communication path 110 using its direct path IP address, IP@B2. According to one embodiment, upon receipt of the SIP OK message, the UE 102a may begin to send media packets corresponding to the designated IP flows over the direct communication path 110. For example, the UE 102a may switch the IP addresses for the designated IP flows to IP@B2 and IP@A2 and begin communicating packets corresponding to the IP flow using these addresses.

The UE 102a sends a SIP ACK message acknowledging receipt of the SIP OK message. According to one embodiment, upon receipt of the SIP ACK message, the UE 102b may begin to send media packets corresponding to the designated IP flows over the direct communication path 110. For example, the UE 102b may switch the IP addresses for the designated IP flows to IP@B2 and IP@A2 and begin communicating packets corresponding to the IP flow using these addresses.

During period 210, and in response to the re-routing of traffic flows to the direct communication path during period 208, the UEs 102a, 102b are able to use the direct communication path 110 for at least a subset of IP flows. For example, the UEs 102a, 102b may communicate a video IP flow over the direct communication path 110 while continuing to communicate an audio IP flow over the infrastructure communication path 108.

Figure 3:
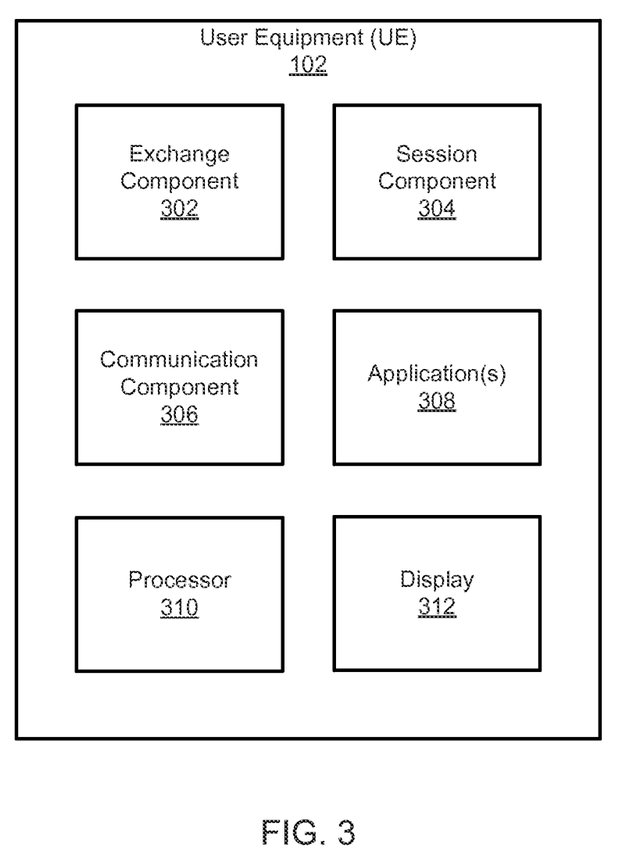
FIG. 3 is a schematic block diagram of components of a UE consistent with embodiments disclosed herein.

FIG. 3 is a block diagram illustrating example components of a UE 102, such as the UE 102a and the UE 102b of FIG. 1. In one embodiment, the UE 102 may be configured to switch an IP flow from an infrastructure communication path 108 to a direct communication path 110. In one embodiment, the UE 102 may be configured to perform one or more of the functions depicted in FIG. 2. The UE 102 includes example components including an exchange component 302, a session component 304, a communication component 306, one or more applications 308, a processor 310, and a display 312.

The exchange component 302 exchanges direct communication path availability information with another UE 102. For example, the exchange component 302 may be configured to send and/or receive one or more of the messages depicted during period 206 of FIG. 2. According to one embodiment, the exchange component 302 exchanges information regarding the direct communication path availability, so that necessary information is had by both of the UEs 102 prior to using the direct communication path for data exchange. In one embodiment, the exchange component 302 exchanges direct path availability information by sending and/or receiving SIP messages that include the direct path availability information. For example, the exchange component 302 may send or receive a SIP INFO message and send or receive a SIP response message indicating receipt or processing of the SIP INFO message.

The direct path availability information may include a variety of information. In one embodiment, the direct path availability information may include one or more IP addresses, ports, designated IP flows, applications, or other data that may be needed to re-route traffic flows to the direct communication path. According to one embodiment, the direct path availability information is exchanged prior to re-routing of an IP flow. In one embodiment, exchanging the direct path availability information prior to re-routing of traffic flows allows each of the UEs 102 to simultaneously switch its own address, as well as the address for another UE 102 for a specific IP flow.

The session component 304 controls re-routing of traffic flows to and from the direct communication path. For example, the session component 304 may be configured to send and/or receive one or more of the messages depicted during period 208 of FIG. 2. According to one embodiment, the session component 304 modifies an existing communication session by re-routing traffic flows to the direct communication path based on the direct path availability information exchanged by the exchange component 302. For example, the session component 304 may include information for re-routing of traffic flows to the direct communication path within a SIP INVITE message to another UE 102 or may receive a SIP INVITE message. In one embodiment, the session component 304 may send or receive a SIP response message based on sending or receiving the SIP INVITE message.

In one embodiment, the session component 304 assigns an IP flow to a specific path such that the IP flow is communicated using source and destination IP addresses for the assigned path. In one embodiment, the session component 304 simultaneously switches a source IP address and a destination IP address for a specific IP flow to prevent loss of packets during transition from one path to another. In one embodiment, the session component 304 only switches a subset of IP flows to a different path. For example, the session component 304 may switch a video IP flow from an infrastructure communication path 108 to a direct communication path 110 while maintaining an audio or voice IP flow on the infrastructure communication path 108.

In one embodiment, the session component 304 may switch an IP flow from a direct communication path 110 back to an infrastructure communication path in response to determining that the UE 102 is outside a direct communication path range of another UE 102. For example, if a first UE 102 moves out of range, or begins moving out of range, of a second UE 102, the session component 304 may move any IP flows back to the infrastructure communication path 108.

The communication component 306 communicates data between the UE 102 and another UE. For example, the communication component 306 may be configured to communicate with other radios, terminals, or networks to communicate data to another UE 102 either directly or indirectly through another device or network, such as via an infrastructure communication path 108.

In one embodiment, the communication component 306 communicates data based on the assignment of IP flows to paths by the session component 304. For example, the communication component 306 may, in response to the session component 304 re-routing traffic flows to the direct communication path, send to and receive from another UE 102 data corresponding to an IP flow over the direct communication path 110. The direct communication path 110 may include a Wi-Fi Direct communication path, an LTE direct communication path, or any other direct communication path 110 based on any other communication standard, protocol or frequency.

In one embodiment, the communication component 306 includes one or more radios and/or one or more antennas for communicating according to a variety of standards and/or protocols. In one embodiment, for example, the communication component 306 includes an LTE radio and/or antenna as well as a Wi-Fi radio and/or antenna. One of skill in the art will recognize various other radios or antennas that may be used without departing from the scope of the present disclosure.

In one embodiment, the communication component 306 may communicate a first IP flow over a first communication path and a second IP flow over a second communication path. For example, the communication component 306 may communicate one IP flow over the infrastructure communication path 108 while also communicating a different IP flow over the direct communication path 110.

In one embodiment, the UE 102 includes one or more applications 308. The applications 308 may provide services or functionality on the UE 102. For example, the applications 308 may include a video conference application, voice telephone application, or other application that allows a user to communicate with a user on another device. In one embodiment, IP flows corresponding to one or more of the applications may be switched between different paths to reduce a load on infrastructure or provide increased functionality.

The UE 102 may include a processor for processing instructions or code that is included in one of the other components 302-308. For example, at least a portion of one or more of the components 302-308 may be implemented in software, which may then be executed by the processor. In one embodiment, the UE 102 comprises a smart phone, tablet computer, laptop computer, net book computer, or other processing device that includes a processor 310 for executing instructions.

The UE 102 may include a display 312 for providing a user interface for a user. The display may be used to render video, graphics, text, or other graphical media for viewing by the user. For example, video corresponding to a conference call with another UE 102 or other location may be received by the UE 102 and displayed on the display 312 for viewing by the user. The UE 102 may also include other types of output devices, such as speakers, vibration mechanism, or other output devices for interfacing with a user.

Figure 4:
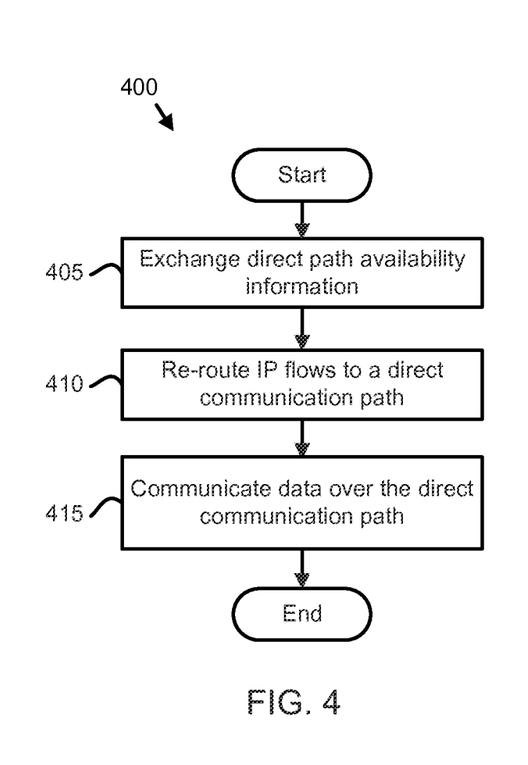
FIG. 4 is a flow chart of a method for re-routing of traffic flows to a direct path consistent with embodiments disclosed herein.

FIG. 4 is a schematic flow chart diagram of a method 400 for re-routing of traffic flows to the a different communication path. The method 400 may be performed by a UE 102, such as the UE 102a or the UE 102b of FIG. 1. In one embodiment, the method 400 may be used to re-route an IP flow from an infrastructure communication path 108 to a direct communication path 110.

The method 400 begins and an exchange component 302 exchanges in 405 direct path availability information with another UE 102. The exchange component 302 may exchange in 405 information by sending and receiving SIP messages comprising the direct path availability information over an infrastructure communication path.

The method 400 uses a session component 304 to re-route in 410 traffic flows to the direct communication path 110 based on the direct path availability information. The session component 304 may communicate with another UE 102 to initiate in 410 the re-routing of traffic flows to the direct communication path based on the information exchanged in 405 by the exchange component 302.

The method 400 uses a communication component 306 communicating in 415 data corresponding to an IP flow over the direct communication path 110. The communication component 306 may communicate in 415 the data corresponding to the IP flow in response to the session component 304 initiating in 410 re-routing of traffic flows to the direct communication path.

Figure 5:
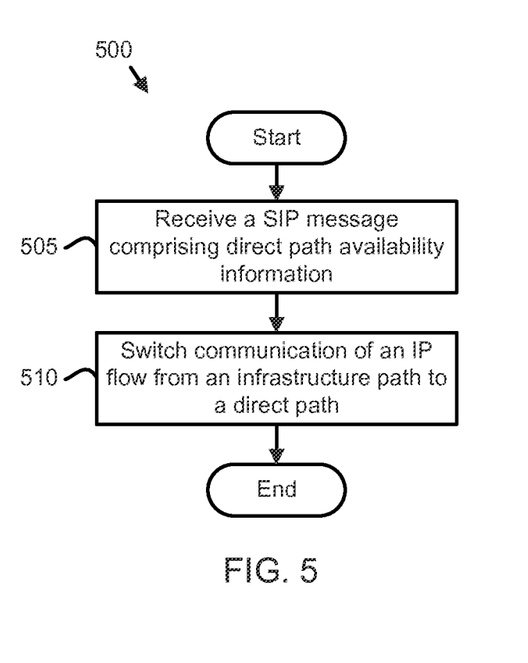
FIG. 5 is a flow chart of a method for switching communication of an IP flow from an infrastructure communication path to a direct communication path consistent with embodiments disclosed herein.

FIG. 5 is a schematic flow chart diagram of a method 500 for switching communication of an IP flow from an infrastructure communication path to a direct communication path. The method 500 may be performed by any mobile terminal, such as the UE 102a or the UE 102b of FIG. 1.

The method 500 begins and a mobile terminal receives in 505 a SIP message over an infrastructure communication path 108 that includes direct path availability information for a nearby mobile terminal.

The method 500 also uses the mobile terminal to switch in 510 communication of one or more IP flows to a direct communication path based on the direct path availability information received in 505. The mobile terminal may switch in 510 one or more IP flows from being communicated over the infrastructure communication path 108 to being communicated over the direct communication path 110. The mobile terminal may switch in 510 the one or more IP flows by assigning new direct path IP addresses to be used in relation to the IP flows.

Figure 6:
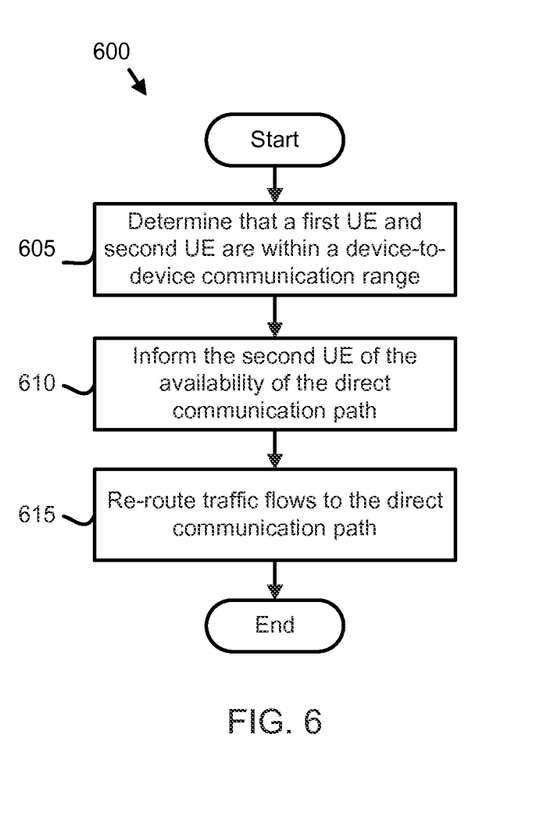
FIG. 6 is a flow chart of a method for re-routing of traffic flows to a direct path consistent with embodiments disclosed herein.

FIG. 6 is a schematic flow chart diagram of another method 600 for re-routing of traffic flows to the direct communication path. The method 600 may be performed by any mobile terminal, such as the UE 102 of FIG. 3.

The method 600 begins and a first UE 102 determines in 605 that the first UE 102 is in sufficient proximity to a second UE 102 for communication over a direct communication path. The first UE 102 may determine in 605 that the first UE 102 is in proximity based on input from a user, input from a server or other device, and/or based on wireless discovery between the first UE 102 and the second UE 102.

The method 600 also uses the first UE 102 to inform in 610 the second UE 102 of the availability of the direct communication path. The first UE 102 may inform in 610 the second UE 102 using a SIP message sent over an infrastructure communication path 108.

The method 600 also uses the first UE 102 to re-route in 615 traffic flows from the infrastructure communication path to the direct communication path. In one embodiment, the direct communication path includes a direct communication path 110 as depicted in FIG. 1. In one embodiment, only a portion of the communications between the first UE 102 and the second UE 102 is communicated in 615 over the direct communication path.

Some of the components that can be used with embodiments disclosed herein are already available, such as general-purpose computers, mobile phones, computer programming tools and techniques, digital storage media, and communications networks. A computing device, such as a mobile terminal, UE or the like, may include a processor such as a microprocessor, microcontroller, logic circuitry, or the like. The processor may include a special purpose processing device such as an ASIC, PAL, PLA, PLD, FPGA, or other customized or programmable device. The computing device may also include a computer-readable storage device such as non-volatile memory, static RAM, dynamic RAM, ROM, CD-ROM, disk, tape, magnetic, optical, flash memory, or other computer-readable storage medium.

Various aspects of certain embodiments may be implemented using hardware, software, firmware, or a combination thereof. As used herein, a software component may include any type of computer instruction or computer executable code located within or on a non-transitory computer-readable storage medium. A software component may, for instance, comprise one or more physical or logical blocks of computer instructions, which may be organized as a routine, program, object, component, data structure, etc., that performs one or more tasks or implements particular abstract data types.

In certain embodiments, a particular software component may comprise disparate instructions stored in different locations of a computer-readable storage medium, which together implement the described functionality of the component. Indeed, a component may comprise a single instruction or many instructions, and may be distributed over several different code segments, among different programs, and across several computer-readable storage media. Some embodiments may be practiced in a distributed computing environment where tasks are performed by a remote processing device linked through a communications network.

The systems and methods disclosed herein are not inherently related to any particular computer or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions that, when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a Bernoulli drive, a magnetic disk, a punch card, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

One of ordinary skill in the art will appreciate that various modifications and changes can be made without departing from the scope of the present disclosure. For example, various operational functions, as well as components for carrying out operational functions, may be implemented in alternate ways, depending upon the particular application or in consideration of any number of cost functions associated with the operation of the system. Accordingly, any one or more of the functions may be deleted, modified, or combined with other functions. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

It will be obvious to those having skill in the art that many changes may be made to the details of the above-described embodiments without departing from the underlying principles of the invention. The scope of the present invention should, therefore, be determined only by the following claims.

The invention claimed is:

1. User equipment (UE) comprising:
    logic, at least a portion of which comprises circuitry, to:
        exchange second communication path availability information between the UE and another UE, wherein the exchange is to send and receive session initiation protocol (SIP) messages comprising the second communication path availability information over a first communication path;
        change a communication session by re-routing traffic flows to the second communication path based on the second communication path availability information;
        in response to changing the communication session, send to and receive from the other UE data corresponding to a first traffic flow over the second communication path, wherein the first traffic flow comprises an existing traffic flow and wherein the data of the existing traffic flow is switched from the first communication path to the second communication path;
        in response to determining that the UE is outside a proximity services (ProSe) communication path range of the other UE, initiate re-routing of traffic flows back to the first communication path.

2. The UE of claim 1, wherein the logic is further to send and receive the SIP messages over an evolved packet core (EPC) communication path.

3. The UE of claim 1, wherein the second communication path availability information comprises an internet protocol (IP) address for use over the second communication path.

4. The UE of claim 1, wherein the logic is further to send and receive from the other UE data corresponding to a second traffic flow over the first communication path, wherein the first traffic flow comprises video media packets and the second traffic flow comprises voice media packets.

5. The UE of claim 1, wherein the first communication path comprises an evolved packet core (EPC) communication path and the second communication path comprises a ProSe communication path.

6. The UE of claim 1, wherein the UE communicates with the other UE over the first communication path through an internet protocol (IP) multimedia system (IMS) via a first evolved packet system (EPS) and the other UE is configured to communicate through the IMS via a second EPS.

7. The UE of claim 6, wherein the first EPS and the second EPS are separately owned.

8. The UE of claim 1, wherein the logic is further to send and receive SIP messages comprising one or more first SIP messages, the first SIP messages comprising the second communication path availability information.

9. The UE of claim 1, wherein the logic is further to initiate re-routing of traffic flows over the second communication path by sending a SIP INVITE message via the first communication path.

10. The UE of claim 1, wherein the logic is further to change the communication session by re-routing traffic flows to the second communication path by receiving a SIP INVITE message and sending a SIP OK message via the first communication path.

11. The UE of claim 1, wherein the logic is further to change the communication session by re-routing traffic flows to the second communication path by receiving a SIP OK message and sending a SIP ACK message via the first communication path.

12. The UE of claim 1, wherein to initiate the re-routing of traffic flows back to the first communication path, the logic is further configured to send a SIP INVITE message via the first communication path, wherein the first communication path comprises an evolved packet core (EPC) communication path and the second communication path comprises a ProSe communication path.

13. The UE of claim 1, further comprising a first antenna for communication over an evolved packet core (EPC) communication path and a second antenna for communication over a ProSe communication path.

14. A mobile terminal configured to:
    receive a message over an infrastructure communication path comprising an evolved node B (eNB) and an internet protocol multimedia system (IMS), the message comprising direct path availability information for a nearby mobile terminal; and
    switch communication of one or more traffic flows to a direct communication path based on the direct path availability information, wherein data corresponding to the one or more traffic flows is switched from being communicated over the infrastructure communication path to being communicated over the direct communication path, wherein the one or more traffic flows comprise an existing traffic flow, wherein the data of the existing traffic flow is switched from the first communication path to the second communication path, and wherein switching the one or more traffic flows to the direct communication path comprises substantially simultaneously switching to a direct path address for the mobile terminal and a direct path address for the nearby mobile terminal for the one or more traffic flows.

15. The mobile terminal of claim 14, wherein the direct path availability information of the SIP message comprises an internet protocol (IP) address of the nearby mobile terminal.

16. The mobile terminal of claim 14, wherein the mobile terminal is further configured to determine that the direct communication path will utilize an IP subnet disjoint from the infrastructure communication path based on the SIP message.

17. The mobile terminal of claim 16, further comprising obtaining an IP address for the mobile terminal corresponding to the disjoint IP subnet.

18. The mobile terminal of claim 14, wherein prior to switching communication of the one or more traffic flows the mobile terminal and the nearby mobile terminal are engaged in communication of the one or more traffic flows and a second traffic flow over the infrastructure communication path, and wherein in response to switching communication the one or more traffic flows are communicated via the direct communication path and the second traffic flow continues to be communicated via the infrastructure communication path.

19. At least one non-transitory computer-readable storage medium having stored thereon instructions that, when executed by a processor, cause the processor to perform operations comprising:
    determining that a first user equipment (UE) is in sufficient proximity to a second UE for communication over a direct communication path, the first UE and the second UE engaged in internet protocol (IP) multimedia subsystem (IMS) communication over an infrastructure communication path;
    informing the second UE of the availability of a direct communication path; and re-routing traffic flows from the infrastructure communication path to the direct communication path while maintaining IMS service continuity, wherein the traffic flows comprise an existing traffic flow, wherein the data of the existing traffic flow is switched from the first communication path to the second communication path, wherein the first UE sends to and receives from the second UE data corresponding to a second traffic flow over the first communication path, wherein the existing traffic flow comprises video media packets, and wherein the second traffic flow comprises voice media packets.

20. The at least one non-transitory computer-readable storage medium of claim 19, wherein re-routing comprises re-routing the traffic flows to be communicated over a Wi-Fi direct communication path.

21. The at least one non-transitory computer-readable storage medium of claim 19, wherein re-routing comprises re-routing the traffic flows to be communicated over a long term evolution (LTE) direct communication path.

* * * * *